United States Patent Office 3,781,367
Patented Dec. 25, 1973

3,781,367
PREPARATION OF 4-MERCAPTOPHENOLS
Robert J. Laufer, Colts Neck, N.J., assignor to
Continental Oil Company, Ponca City, Okla.
No Drawing. Filed Jan. 15, 1970, Ser. No. 3,193
Int. Cl. C07c 149/36
U.S. Cl. 260—609 D                    9 Claims

ABSTRACT OF THE DISCLOSURE

Certain thiocyanophenols are converted by caustic hydrolysis under certain conditions to mercaptophenols. The thiocyanophenols which are so converted are those having the following general formula:

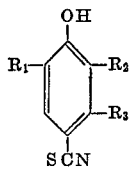

where $R_1$ is hydrogen or a $C_1$–$C_4$ alkyl radical; $R_2$ is hydrogen or a $C_1$–$C_2$ alkyl radical; and $R_3$ is hydrogen or a methyl radical, provided that $R_2$ is hydrogen when $R_1$ is a butyl radical.

BACKGROUND OF THE INVENTION (1) Field of the invention

This invention relates to the preparation of 4-mercaptophenols, and more particularly to those having the following general formula:

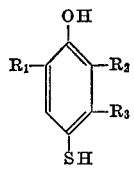

where $R_1$ is hydrogen or a $C_1$–$C_4$ alkyl radical; $R_2$ is hydrogen or a $C_1$–$C_2$ alkyl radical; and $R_3$ is hydrogen or a methyl radical, provided that $R_2$ is hydrogen when $R_1$ is a butyl radical.

Mercaptophenols are generally useful for the preservation of oxidizable organic compounds, e.g. rubber (see U.S. Pats. No. 1,949,240 and No. 3,218,291). They may also be used as intermediates in the production of biologically active derivatives. For example, they are intermediates in the synthesis of various alkylmercaptophenyl phosphoric acid ester amines used as contact insecticides and as systemic agents. One such synthesis is shown in U.S. Pat. No. 2,978,479.

(2) Description of the prior art

Various methods have been proposed for the preparation of mercaptophenols. In one method, described in U.S. Pat. No. 2,810,765, a phenol is sulfurized by reaction with sulfur monochloride, and the polysulfide product formed is hydrogenated to yield the desired mercaptophenol. Low yields of mercaptophenols are obtained because of thiobisphenol formation. In another method, mercaptophenols are prepared from aminophenols via the Leuckart synthesis; but the process is too elaborate and costly for commercial use and requires as starting materials the more expensive aminophenols.

In a method described in U.S. Pat. No. 2,923,743, the phenol is reacted with a dialkyl disulfide in the presence of an acidic condensation agent to yield the S-alkyl derivative of a mercaptophenol, rather than mercaptophenols.

In U.S. Pat. No. 3,129,262, I describe a process for preparing mercaptophenols from organic thiocyanates which is suitable for semi-continuous operation. In that process, the organic thiocyanates are converted to thiols by reacting the organic thiocyanate with alkali metal-anhydrous liquid ammonia reagent. The thiocyanate is dissolved in anhydrous liquid ammonia and then reacted with the alkali metal to form the alkali salt of the organic mercaptan as well as alkali cyanide. Acidification then frees the mercaptan and hydrogen cyanide from their alkali salts. This selective cleavage technique is generally applicable to all organic thiocyanates. However, scale-up of sodium-liquid ammonia reductions presents many problems.

Inasmuch as phenols may now be readily converted to thiocyanophenols (see U.. Pat. No. 3,202,690), any process for directly converting such thiocyanophenols to mercaptophenols in high yield under commercially feasible conditions is a desired process. Attempts to convert the thiocyanophenol directly to the mercaptophenol by caustic hydrolysis have resulted in the disulfide, thus (1) $2RSCN + NaOH \rightarrow RSSR + NaCN + NaOCN + H_2O$ (see Organic Reactions, volume III, p. 250, 1946 edition)

U.S. Pat. No. 3,274,257 describes the preparation of (alkylthio)phenols from (thiocyanato)phenol by the following reaction:

(2) 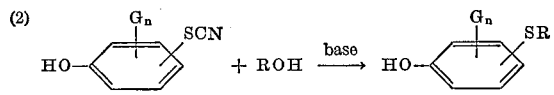

wherein $n$ is an integer of from 0 to 4, both inclusive, G is halo, alkyl, alkenyl, alkynyl, cycloalkyl, aryl, aralkyl, alkoxy, aryloxy, nitro, cyano, amido, amino, or hydrocarbyloxycarbonyl and R is an alkyl group of from 1 to 6 carbon atoms of which the compound ROH can have hydroxyl groups that are attached to primary or secondary, but not tertiary, carbon atoms.

SUMMARY OF THE INVENTION

I have discovered that certain thiocyanophenols are converted by aqueous caustic hydrolysis to mercaptophenols in good yields, provided the mole ratio of caustic to thiocyanophenol is at least two, and provided no lower aliphatic alcohols are present. The thiocyanophenols which I have found to respond to such conversion may be represented by the following formula:

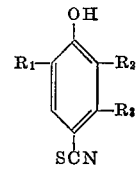

where $R_1$ is hydrogen or a $C_1$–$C_4$ alkyl radical; $R_2$ is hydrogen or a $C_1$–$C_2$ alkyl radical; $R_3$ is hydrogen or $CH_3$, provided that when $R_1$ is a $C_4$ alkyl radical, $R_2$ is hydrogen.

It is critical to the success of the present process that, not only one of the recited thiocyanophenols be selected as feedstock, but also the mole ratio of caustic to thiocyanophenol must be at least two. If the following equation is postulated as the reaction taking place, then a mole ratio of one would be expected.

(3)          $RSCN + NaOH = RSH + NaCNO$

In the case where the disulfide is the principal product, the requisite mole ratio is 0.5. It is apparent that, in the case of the starting thiocyanophenols of this invention, the reaction is too complex to be expressed by any simple equation.

The hydrolysis conditions which are preferred for the conversion of the recited thiocyanophenols to the corresponding mercaptophenols are as follows:

Caustic concentration _____ 5 to 50% NaOH/KOH.
Mole ratio, caustic/thiocy-
  anate _____ At least 2.
Temperature range _____ 40 to 150° C.
Reaction time _____ At least 3, and preferably not more than 20 hours.

Experimental results

The following Table I tabulates the conditions and results of illustrative experiments conducted to establish the conditions for the practice of the process of the present invention to make 4-mercapto-o-cresol.

TABLE I
Hydrolysis of 4-thiocyano-o-cresol

| Run No. | Mole ratio | NaOH (weight percent) | Temp. (° C.) | Time (hrs.) | Solvent | Yield[1] of 4-mercapto-o-cresol (percent) |
|---|---|---|---|---|---|---|
| 1 | 1 | 10 | 50 | 4 | None | (²) |
| 2 | 2 | 10 | 95 | 5 | ---do--- | 54.3 |
| 3 | 3 | 10 | 95 | 5 | ---do--- | 82.7 |
| 4 | 3 | 10 | 20-24 | 18 | ---do--- | 4.7 |
| 5 | 3 | 10 | 50 | 18 | ---do--- | 43.2 |
| 6 | 3 | 10 | 70 | 18 | ---do--- | 52.0 |
| 7 | 3 | 12.8% KOH | 95 | 5 | ---do--- | 83.0 |
| 8 | 3 | 20 | 50 | 4 | ---do--- | 70.0 |
| 9 | 3 | 20 | 100 | 5 | ---do--- | 83.5 |
| 10 | 3 | 20 | 95 | 18 | ---do--- | 69.0 |
| 11 | 3 | 40 | 95 | 7 | ---do--- | 46.2 |
| 12 | 3 | 15 | 80 | 7 | Toluene | 41.0 |
| 13 | 3 | 15 | 96 | 5 | Xylene | 84.4 |
| 14 | 3 | NaOMe | 66 | 6 | MeOH | 0.9 |

[1] Percent of theory based on charged 4-SCN-o-cresol.
² No distillable product.

Comments.—Runs 1 to 3 inclusive establish the criticality of the mole ratio. The mole ratio of 3 was definitely established as the optimum, although ratios in excess of three gave nearly as good results as 3. However, there is no advantage gained by using such larger ratios, but rather, an economic disadvantage because of using more caustic than necessary.

Runs 3 to 6 inclusive demonstrate the effect of temperature. Poor yields are obtained at temperatures below 40° C., for example 20-24° C. (Run 4). The yield improves with higher temperatures, reaching 82.7% at 95° C. No advantage has been found in exceeding 150° C.

Run 7 establishes the essential equivalence of NaOH and KOH in the present process.

Runs 8 to 10 inclusive demonstrate that caustic concentration is not critical, at least in the intermediate range, although Run 11, with 40% caustic concentration, indicated a drop in yield. A caustic concentration in the neighborhood of 10% seemed to be optimum, hence the selection of 5% as a preferred lower limit.

Runs 9 and 10 indicate an effect of reaction time on yield. In general, it was found that permitting the reaction to run beyond 20 hours had an adverse effect on yield, suggesting the presence of side reactions favored by time.

Runs 12 to 14 inclusive established that the presence of hydrocarbon solvents did not prevent the desired reaction, although the yield was affected in some instances. However, methanol, typical of the lower aliphatic alcohols, very definitely participated in the reaction which confirmed the teachings of the aforementioned Pat. No. 3,274,257. Only 0.9% yield of 4-mercapto-o-cresol was obtained.

Examples 1 to 4 presented below further illustrate the process of the present invention.

EXAMPLE 1

Hydrolysis of 4-thiocyanophenol (including preparation of 4-thiocyanophenol)

A five-liter reaction flask was charged with 376.5 grams (4 moles) of U.S.P. phenol, 640 grams of ammonium thiocyanate (Baker and Adamson purified) and 1600 milliliters of reagent methanol. The stirred slurry was cooled to 0° C. by direct addition of small pieces of Dry Ice to the reaction mixture. Chlorine (290 grams) was added via a sparge tube over a period of 68 minutes. The chlorination was carried out as rapidly as possible, consistent with maintenance of a 0° reaction temperature. The mixture was stirred one-half hour longer, then anhydrous ammonia (72 grams) was added at 0° over a period of 31 minutes. The reaction flask was then arranged for vacuum distillation with an ice-water cooled condenser and receiver. Methanol was distilled at 200 mm. Hg to a maximum pot temperature of 70° C. over a 1.5-hour period. Recovery was 1435 milliliters of 86% of the charge.

The hot residual salt-oil slurry was treated with 1000 milliliters of hot water. After the salts had dissolved, stirring was halted and the precipitated heavy oil drained. The aqueous phase was extracted with 800 milliliters of benzene; then was discarded. The benzene extract was washed with 100 milliliters of hot water and was added to the oil phase.

One-half of the crude thiocyanophenol solution was placed in a 5-liter reaction flask; and water, methanol and benzene were distilled to a maximum pot temperature at 60 mm. The apparatus was purged thoroughly with nitrogen and a solution of 246 grams of NaOH in 1392 milliliters of water was added rapidly. Heat was applied and a small amount of volatile matter was permitted to escape until a reflux temperature of 96° C. was reached 27 minutes after the caustic addition. After six hours at reflux, the mixture was cooled to 50° and toluene (250 milliliters) was added, followed by 525 milliliters of concentrated hydrochloric acid. The temperature was held at 50° C. by cooling.

The toluene phase and a 180 milliliter toluene extract of the aqueous phase were combined and dried over MgSO₄. Distillation through a ¾" x 24" Vigreux column at 10 mm. gave an 82 percent yield of 4-mercaptophenol (B.P. 125–128° C., M.P. 31.0–35.5° C.).

EXAMPLE 2

Hydrolysis of 4-thiocyano-o-cresol

A suitably equipped 1-liter flask was charged with 41 grams of NaOH and 232 milliliters of H₂O. A nitrogen sparge of 0.5 s.c.f.h. was established. After ½ hour, 4-SCN-o-cresol (55 grams) was added at 85° C. The temperature rose immediately to 96° C. and was held there for five hours. The solution was cooled to 10° C., ether (100 milliliters) was added; then 6 N aqueous HCl (175 milliliters) at 10° C. was added over ten minutes. The ether phase was combined with a 50-milliliter ether extract of the aqueous phase and washed with two 50-milliliters of brine. A slight gel which had formed in the ether solution vanished during the brine treatment. The ether phase was dried over MgSO₄. The solution was filtered. No H₂O insolubles were found in the cake. Ether was removed to 50° C. with partial vacuum and 25 milliliters of benzene added to the residue. A clear solution resulted. Benzene was distilled and product (40.6 grams) was collected on a ½" x 12" Vigreux at 80–100° C. at 1.0 mm. Hg to a 200° C. pot temperature. The residue weighed 3.2 grams. The distillate was analyzed by gas chromatography and found to contain 86% 4-mercapto-o-cresol which corresponds to a 75% yield.

EXAMPLE 3

Hydrolysis of 4-thiocyano-m-cresol

Sodium hydroxide pellets (41 grams, i.e. about 1.0 mole) dissolved in 160 grams of water, were purged with N₂ for ½ hour and then cooled to 30° C. 4-thiocyano-m-cresol (55 grams, i.e. 0.5 mole) was added as a powder. The temperature of the reaction mixture rose to 50° C. immediately upon addition of the 4-thiocyano-m-cresol and was held at 50° C. for 4 hours during which nitrogen was bubbled through the reaction mixture. Then, the mixture was cooled rapidly to 10° C. and 6 N HCl (175 milliliters) was added. The acidified mixture was extracted with 3 successive 200-milliliter portions of ether. The ether extracts were dried over magnesium sulfate prior to distillation in ½" x 2' Vigreux column. The distillate product consisted of 36.5 grams of a colorless, crystalline solid which distilled over at a temperature between 130 and 138° C. at 10 mm. Hg. This solid was substantially pure 4-mercapto-m-cresol. The yield based on the 4-thiocyano-m-cresol charged was 78 percent.

EXAMPLE 4

Hydrolysis of 4-thiocyano-2-t-butylphenol

A 4-necked, round-bottom, one-liter flask (suitably equipped with stirrer, sparge tube, condenser and thermometer) was charged with 41 grams of NaOH and 370 milliliters of deionized water. A stream of nitrogen (.5 s.c.f.h.) was introduced through the sparge tube and allowed to run for two hours. Then 4-thiocyano-2-t-butylphenol (69 grams) was added. The temperature rose to 95° C. where it was maintained for four hours. The product mixture was cooled and allowed to stand overnight (ca. 16 hours) with a nitrogen purge of 0.1 s.c.f.h. Ether (100 milliliters) was added. The reaction mixture was cooled to 8° C. Then 6 N HCl (175 milliliters) was added at a rate such that the temperature did not exceed 20° C. The phases were separated and the aqueous phase was washed with 100 milliliters of ether. The combined ether phases were dried over $MgSO_4$, filtered and distilled. 39.0 grams of 4 - mercapto-2-t-butylphenol was recovered, amounting to 65 percent yield based on the 4-thiocyano-2-t-butylphenol charged.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. An aqueous hydrolysis process for making a 4-mercaptophenol from a thiocyanophenol selected from thiocyanophenols of the following general formula:

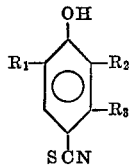

wherein $R_{11}$ is hydrogen or a $C_1$–$C_4$ alkyl radical; $R_2$ is hydrogen or a $C_1$–$C_2$ alkyl radical; and $R_3$ is hydrogen or a methyl radical, provided that when R is a butyl radical $R_2$ is hydrogen, said process comprising combining said thiocyanophenol and an aqueous caustic selected from NaOH and KOH with the mole ratio of caustic to thiocyanophenol being at least two to one with essentially no low molecular weight aliphatic alcohol being present, maintaining the combination at a temperature in the range of about 40–150° C., and recovering the 4-mercaptophenol product.

2. An aqueous hydrolysis process for making a 4-mercaptophenol from a thiocyanophenol selected from thiocyanophenols of the following general formula:

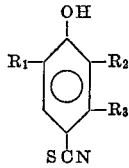

wherein $R_1$ is hydrogen or a $C_1$–$C_4$ alkyl radical; $R_2$ is hydrogen or a $C_0$–$C_2$ alkyl radical; and $R_3$ is hydrogen or a methyl radical, provided that when $R_1$ is a butyl radical $R_2$ is hydrogen, said process comprising combining said thiocyanophenol and a 5–50% by weight aqueous caustic selected from NaOH and KOH with the mole ratio of caustic to thiocyanophenol being at least two to one with essentially no low molecular weight aliphatic alcohol being present, maintaining the combination at a temperature in the range of about 40–150° C. for a reaction period of at least 3 hours, and recovering the 4-mercaptophenol product.

3. The process according to claim 2 wherein the thiocyanophenol is 4-thiocyanophenol.

4. The process according to claim 2 wherein the thiocyanophenol is 4-thiocyano-o-cresol.

5. The process according to claim 2 wherein the thiocyanophenol is 4-thiocyano-m-cresol.

6. The process according to claim 2 wherein the thiocyanophenol is 4-thiocyano-2-t-butylphenol.

7. A process of claim 2 in which acid is added to the combination prior to recovering the 4-mercaptophenol product.

8. A process of claim 2 in which the reaction period is in the range of about 3–20 hours.

9. A process of claim 2 in which the hydrolysis is conducted in the presence of a hydrocarbon solvent.

References Cited

UNITED STATES PATENTS 3,129,262    4/1964    Laufer _____ 260—609 D X

OTHER REFERENCES

Theilheimer, "Synthetic Methods," vol. 2, p. 17 (item 54).

Theilheimer, "Synthetic Methods," vol. 19, p. 19 (item 40).

Reid, "Organic Chemistry of Bivalent Sulfur," III, 375–6 (1960).

Adams et al., "Organic Reactions," III, 250 (1960).

LEWIS GOTTS, Primary Examiner

D. R. PHILLIPS, Assistant Examiner

U.S. Cl. X.R.

260—454

PO-1050
(5/69)

UNITED STATES PATENT OFFICE
CERTIFICATE OF CORRECTION

Patent No. 3,781,367      Dated December 25, 1973

Inventor(s) Richard J. Laufer

It is certified that error appears in the above-identified patent and that said Letters Patent are hereby corrected as shown below:

Column 2, line 16, "(see U.. Pat. No. 3,202,690)," should be --(see U.S. Patent No. 3,202,690),--

Column 6, line 15, "$C_0-C_2$" should be --$C_1-C_2$--

Signed and sealed this 17th day of September 1974.

(SEAL)
Attest:

McCOY M. GIBSON, JR.
Attesting Officer

C. MARSHALL DANN
Commissioner of Patents